United States Patent
Irwin et al.

(10) Patent No.: US 10,084,488 B1
(45) Date of Patent: Sep. 25, 2018

(54) CHIP-TO-CHIP PORT COHERENCY WITHOUT OVERHEAD

(71) Applicant: MoSys, Inc., Santa Clara, CA (US)

(72) Inventors: Scott A Irwin, Ames, IA (US); Paul O. Jennings, Austin, TX (US)

(73) Assignee: MoSys, Inc., San Jose, CA (US)

( * ) Notice: Subject to any disclaimer, the term of this patent is extended or adjusted under 35 U.S.C. 154(b) by 0 days.

(21) Appl. No.: 15/199,982

(22) Filed: Jun. 30, 2016

Related U.S. Application Data (60) Provisional application No. 62/187,208, filed on Jun. 30, 2015.

(51) Int. Cl.
| | |
|---|---|
| H04J 3/04 | (2006.01) |
| H04B 1/00 | (2006.01) |
| H04L 12/935 | (2013.01) |
| H04B 3/50 | (2006.01) |
| H04L 12/46 | (2006.01) |

(52) U.S. Cl.
CPC ............ *H04B 1/0057* (2013.01); *H04B 3/50* (2013.01); *H04L 12/46* (2013.01); *H04L 49/30* (2013.01)

(58) Field of Classification Search
CPC ........... H04N 21/4341; H04N 21/2368; H04Q 2213/036; H04Q 2213/13036
See application file for complete search history.

(56) References Cited

U.S. PATENT DOCUMENTS

| | | | | |
|---|---|---|---|---|
| 5,838,680 | A * | 11/1998 | Noiri | H04L 12/5601 370/395.7 |
| 6,233,074 | B1 * | 5/2001 | Lahat | H04J 14/0212 398/79 |
| 6,907,001 | B1 * | 6/2005 | Nakayama | H04L 12/5601 370/230 |
| 7,010,607 | B1 * | 3/2006 | Bunton | H04L 1/18 709/228 |
| 2002/0196520 | A1 * | 12/2002 | Marom | G02B 6/2931 359/290 |
| 2010/0005205 | A1 * | 1/2010 | Brune | G06F 13/4031 710/105 |
| 2012/0033969 | A1 * | 2/2012 | Sakauchi | G02B 6/2932 398/48 |

* cited by examiner

*Primary Examiner* — Siren Wei (57) ABSTRACT

A network system includes a first device and a second device coupled to each other that mux and demux data for LSL to HSL transitions. The muxing and demuxing function in the first and second device, respectively, use timing logic from an existing training protocol, such as link training ("LT"). Although LT is used for establishing links between two chips, and has no provision for maintaining port coherency for port-specific input data on one chip to port-specific output data on another chip, the LT does have a uniquely identifiable logic transition in a known data pattern used for LT that can be multi-purposed for syncing the muxing and demuxing of the two interfaced chips, using a predetermined port sequence on both chips to maintain coherency of port-specific data.

20 Claims, 5 Drawing Sheets

CHIP-TO-CHIP PORT COHERENCY WITHOUT OVERHEAD

PRIORITY CLAIM

This application claims priority to provisional application(s): Ser. No. 62/187,208, filed Jun. 30, 2015; entitled: "CHIP-TO-CHIP PORT COHERENCY WITHOUT OVERHEAD," which application(s) are also incorporated by reference herein in their entirety. Furthermore, where a definition or use of a term in a reference, which is incorporated by reference herein, is inconsistent or contrary to the definition of that term provided herein, the definition of that term provided herein applies and the definition of that term in the reference does not apply.

FIELD OF TECHNOLOGY

This disclosure relates generally to the technical fields of network communication, and in one example embodiment, relates to a method, apparatus and system of communicating data from one chip to another chip while maintaining coherency of port-specific input data and port-specific output data muxed and demuxed on an intermediate channel therebetween.

BACKGROUND

In network communications, line cards, servers, and devices therein communicate to each other across local channels in a backplane or across longer distance channels in a local area network ("LAN") or on long haul backbone between LANs. To send data more efficiently, communication channels that link devices, and especially the long distance channels, can be designed to transmit at much higher data rates on fewer channels for a more cost-effective solution.

However, because the number of lanes changes, as does the data rate on those lanes, a gearbox chip is typically employed to interface the local channels with the long haul channels. An example would mux two local low speed lanes ("LSLs") at a 10 gigabit per second (Gbps) rate into a single high-speed lane ("HSL") with a 20 Gbps or higher data rate. A gearbox chip at the other end of the long haul channel, such as fiber optic trunk, will translate the data back into the LSL for local processing at its end. To do so, gearbox chips at both ends have to coordinate with each other, usually by a proprietary or industry standard protocol, to know what data belongs to which lane. In other words, data send on the first lane and the second lane on the first end should come out on the first lane and the second lane, respectively, at the other end of the long haul channel, despite their data being mixed (or muxed) together on a single channel for the long haul channel. This is called lane coherency.

One solution to maintaining lane coherency would use logic and add latency by inserting overhead data to a packet header indicating the lane to which the data belonged. Then the receiving gearbox on the other end of the long haul channel would use logic and add latency and processing ops to read the header, decide which channel the data belonged, and route it as such. Any solution to train lanes after an existing protocol is completed during initialization will add latency to the bring up. Ensuring coherency on data is critical in effective communication. Without it, data could not be transmitted reliably.

SUMMARY

In network communications, line cards, servers, and devices therein communicate to each other across local channels in a backplane or across longer distance channels in a local area network ("LAN") or on long haul backbone between LANs. To send data more efficiently, communication channels that link devices, and especially the long distance channels, can be designed to transmit at much higher data rates on fewer channels for a more cost-effective solution. Muxing is used to compress data from low-speed lanes ("LSL") to one or more high-speed lanes ("HSL"). Then on the receive side at the back end of the transmission of data, the HSL is demuxed back down to a LSL. If the data muxed is port-specific input data, that is, port 1 has data that is unique to port 1, and must be replicated on the other side to port-specific output data, in order to avoid chaotic interleaving of data, then coherency must be established.

In one embodiment, a network system includes a first device and a second device coupled to each other that use muxing and demuxing for LSL to HSL transitions. Both the first device and the second device have a muxing and demuxing function, respectively, that uses timing logic from an existing training protocol, i.e. link training ("LT"). Although LT is used for establishing links between two chips, and has no provision for maintaining port coherency for port-specific input data on one chip to port-specific output data on another chip, the LT does have a uniquely identifiable logic transition in a known data pattern used for LT that can be multi-purposed for syncing the muxing and demuxing of the two interfaced chips. Thus, the present disclosure provides two benefits from one training protocol by performing the port coherency sync operation at the same time the LT operation occurs. In addition, no appreciable latency is incurred, since the two chips are synced immediately after the LT is complete, and can start mission mode transmission with certainty of port coherency.

For the port coherency process to operate properly, both chips have to have a predetermined port with which to start the muxing and demuxing operations and a predetermined sequence of any remaining ports after the starting port. For example, if a network system transitions via a mux from a four LSL ports to a single HSL port on a first chip and transitioning back from a single HSL to four LSLs via a demux on a mating chip, then both chips have to start their respective operations at a predetermined port when the uniquely identifiable logic transition in the known data pattern occurs. For example, the agreed upon predetermined port could be port 1 for both LSL input on the muxing device and port 1 for the LSL output of the mating demuxing device. Thereafter, the predetermined sequence could be port 4, 3, and 2 for the LSL input on the muxing device and port 4, 3, and 2 on the mating demuxing device. This sampling sequence remains fixed in both devices to ensure coherency. The uniquely identifiable logic transition can be a 1 to 0 transition following six repeated 1 values in a link training operation, in one embodiment, or it can be any other uniquely identifiable logic transition that is predetermined. In the present case, the uniquely identifiable logic transition is transmitted from the first device with the muxing function, and is pipelined via the channel to the second device with the demuxing function. With the current apparatus and method, no out of band data, e.g., via a separate control line, has to be sent along with each packet of data indicating the port ID, which would otherwise consume chip area, routing resources, power, etc. Likewise, with the current method and apparatus, no in-band data, e.g., header information has to be sent with the payload data indicating port identification and markers.

BRIEF DESCRIPTION OF THE VIEW OF DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

A method, apparatus and system of a synchronizing two chips to maintain data coherency. In the following description, for the purposes of explanation, numerous specific details are set forth in order to provide a thorough understanding of the various embodiments. It will be evident, however to one skilled in the art that various embodiments may be practiced without these specific details.

Figure 1:
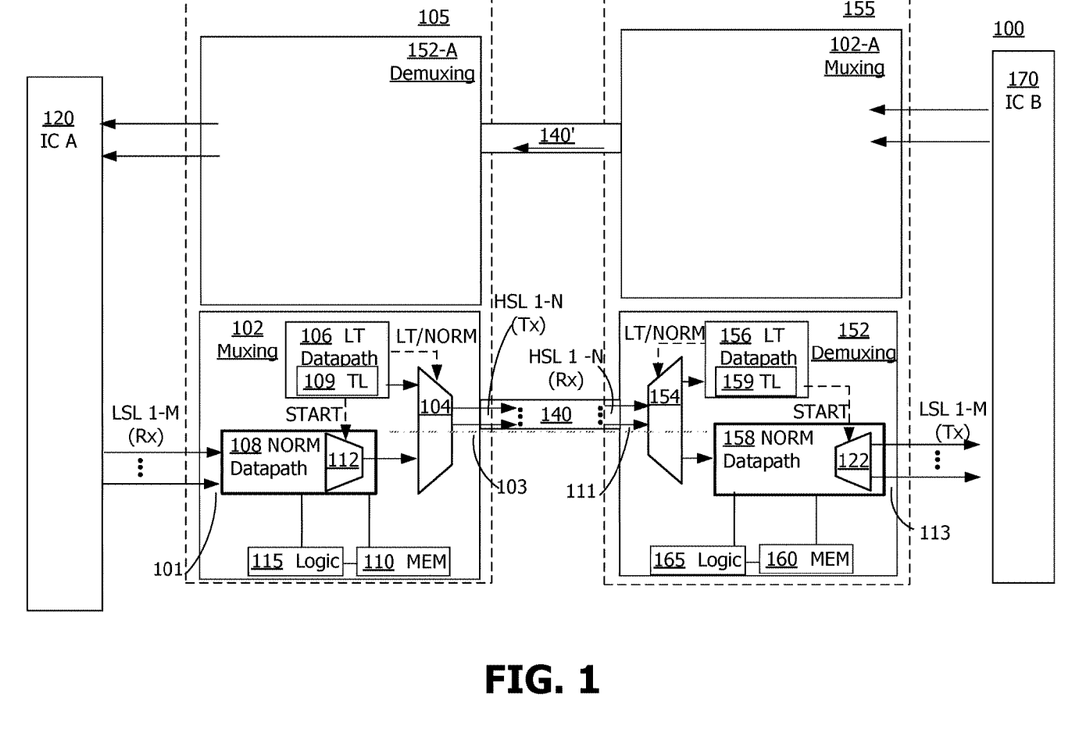
FIG. 1 is a system level block diagram of a two chips with training logic in each to maintain coherency between port-specific input data in one chip to port-specific output data in the second chip after muxing and demuxing, according to one or more embodiments.

Referring now to FIG. 1, a system level block diagram 100 is shown of a two chips 105 and 155, with training logic in each to maintain coherency between port-specific input data in one chip and port-specific output data in the second chip after muxing and demuxing, according to one or more embodiments.

Each chip is a mirror image of the other in one embodiment. Thus chip 105 has a muxing/transmitter block 102 and a demuxing/receiver block 152-A, and chip 155 has a muxing/transmitter block 102-A and a demuxing/receiver block 152, when viewed from the channel medium 140. For sake of brevity, the present embodiment will describe only a single pair of the mux/transmitter and demux/receiver blocks, sometimes referred to as chips for simplicity. Namely, the A2B data transmission path includes mux/transmitter chip 102, and the receiver demux chip 152. Muxing block 102 has one or more input (Rx) ports as low speed lanes (LSLs) numbering 1-M, where M is ≥1 feeding into an input interface 101 for a normal (NORM) datapath block of logic 108 that includes a mux 112. Because the system is a mux/demux interface for different channel speeds, M will be at least 2, and typically 4 or 10 ports, aka lanes. Link training (LT) datapath logic 106, which includes timing logic 109, is coupled to both normal datapath 108 and mux 104. Mux 104 switches between LT mode, which generates the known data pattern for LT, and mission mode, which communicates payload data received from IC A 120.

LT datapath logic and TL 109 provide both a control signal to mux 104 to switch between LT mode and mission mode, and a control signal input (START) to mux 112. Specifically, the start signal to mux 112 indicates when a uniquely identifiable logic transition, e.g., a 1 to 0, occurred in a known data pattern, e.g., six repeating 1s followed by six or more repeating 0s, which then initiates signal mux 112 to begin multiplexing starting with port-specific input data starting with a predetermined port, and followed by a predetermined sequence of remaining ports, e.g., that are hardwired into the circuit. Data from all ports can be buffered and shifted in normal datapath logic 108 to satisfy said predetermined start port and port sequence.

Optional logic 115 and 165 and memory 110 and 160 are coupled to normal datapath logic 108 and 158, respectively, for mux block 102 and demux block 152 to provide programmable start port and sequence of remaining ports in one embodiment. In this manner, damaged or faulty ports can be avoided or rerouted for efficient data transfer. Moreover, because both mux chip 102 and demux chip 152 have the programmable feature, they can each compensate for a faulty port in the other device. Thus, if port 2 encounters a fault before or during mission mode, on muxing block 102 side of the network, then memory 110 and 160, for mux block 102 and demux block 152, respectively, can resequence the order that the ports are sampled, e.g., from "1, 2, 3 and 4" to "1, 3, and 4", while still maintaining coherency between the two blocks 102 and 152. Additional control will be used for this repair and workaround processes.

Mux block 102 output interface 103 transmits LT data and mission mode data onto channel 140, which couples mux block 102 to demux block 152. Channel 140 is comprised of one or more high-speed lanes (HSL) 1-N, where N≥1. Channel 140 is any communication medium, including twisted copper pair, fiber, etc.

Demuxing block 152 is a mirror image of muxing block 102. Thus, input interface 111 receives data from HSL 1-N from channel 140. Mux 154 is coupled to LT datapath logic 156, which includes TL 159, and is coupled to normal datapath 158, which includes demux 122. When the initial LT data stream is communicated from mux block 102 to demux block 152, LT datapath 156 signals to mux 154 a signal for "LT" which routes the data signals to LT datapath logic 156 for evaluation. LT datapath logic 156 routes a control signal to normal datapath logic 158, and specifically to demux 122. When LT data stream detects the uniquely identifiable logic transition, e.g., a 1 to 0, that occurred in the known data pattern, e.g., six repeating 1s followed by six or more repeating 0s, that was originated in mux block 102 and communicated across channel 140 to demux block 152, a control signal of "NORM" is communicated from LT datapath logic 156 to demux 154. This control signal switches the data stream from "LT" to "NORM" and thus route the next bit in the data stream, which is the data from the predetermined first input port with port-specific data received by mux block 102, to the correct output port, e.g., port 1 of LSL 1-M (Tx) at output interface 113. From that point onwards, mux 122 is configured to rotate through the balance of the data stream through normal datapath logic 158 and demux 122.

The present disclosure has a wide range of applications and embodiments. It can be used with a communication protocol that includes no port or lane identity and no port synchronization information. On the other hand, even if a communication protocol, like Ethernet, does include port information, the present disclosure will still be effective on that data stream. While the present embodiment suggests a M:N port muxing ratio of 2:1, with same input port speeds for LSL 1-M (Rx) and same output port speed for LSL 1-M (Tx), other embodiments can include different port speeds. For example, a first port can run at half rate of nominal, and a second and third port can operate at quarter rate of nominal. The resulting port sequencing can be 1, 1, 2, and 3, which is constantly repeated. Another example would be a first port operating at two-thirds speed and a second port operating at one-third speed. The resulting port sequencing would be 1, 1, and 2, which is constantly repeated. So long as the port speeds, or data rates, are integer multiples of each other, a fixed port sequence will ensure port coherency and data throughput.

If data rates are not integer multiples, then a fixed short pattern of port sequencing will most likely result in one of the ports having a slower throughput and an increasing queue of data. For example, if a first port had a 1.2 Gbps and ports 2-4 had 1.0 Gbps, then sequencing each of the ports in a short sequence of 1, 2, 3, and 4 would result in port one backing up. A longer sequence of ports could account for this, e.g., by providing port 1 to be accessed two times for every five cycles of all ports.

Additionally, the port sampling does not need to be a single bit toggling, such as 1, 2, 3, 4, 1, 2, 3, 4, 1, 2, 3, 4, etc. for a four port interface. Data streams can be buffered to sample more than one bit at a time, so long as it is done consistently by both the muxing block 102 and the demuxing block 152. For example, for four equal data rate LSL inputs to muxing block 102, the sampling can be in groups of two or more. Thus, for sampling two bits at a time, the port sequencing would read: 11, 44, 33, 22, 11, 44, 33, 22, 11, etc.

Figure 4:
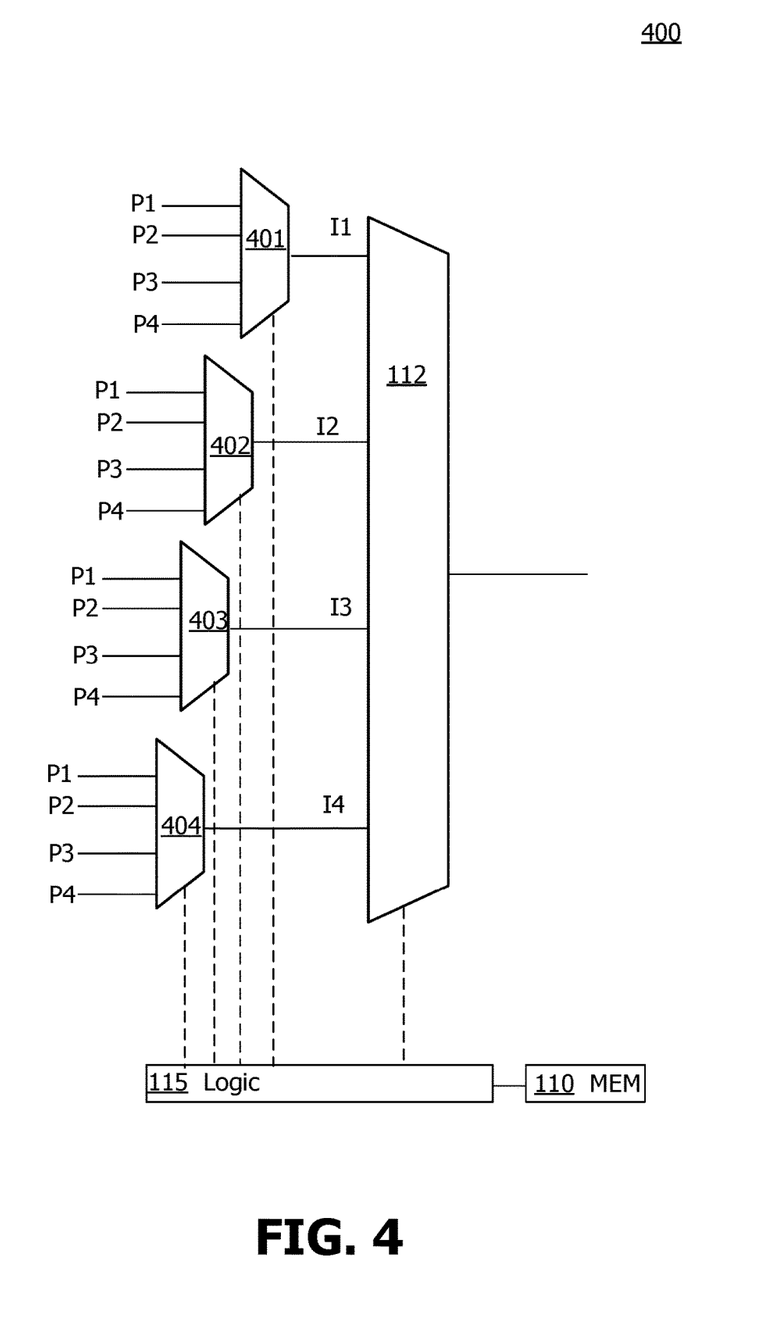
FIG. 4 is a schematic of a programmable port-sequencing circuit for maintaining port-specific input data in one chip to port-specific output data in a second chip, according to one or more embodiments.

These and other feasible embodiments are possible in a hard-wired device or in a selectable or programmable device, where memory 110 and 160 can store the configuration selections that can be changed in the field, during initialization, or on the fly, if a buffer provision is implemented. Subsequent FIG. 4 provides one embodiment of a programmable, or selectable, starting port and sequence of remaining ports.

Figure 2:
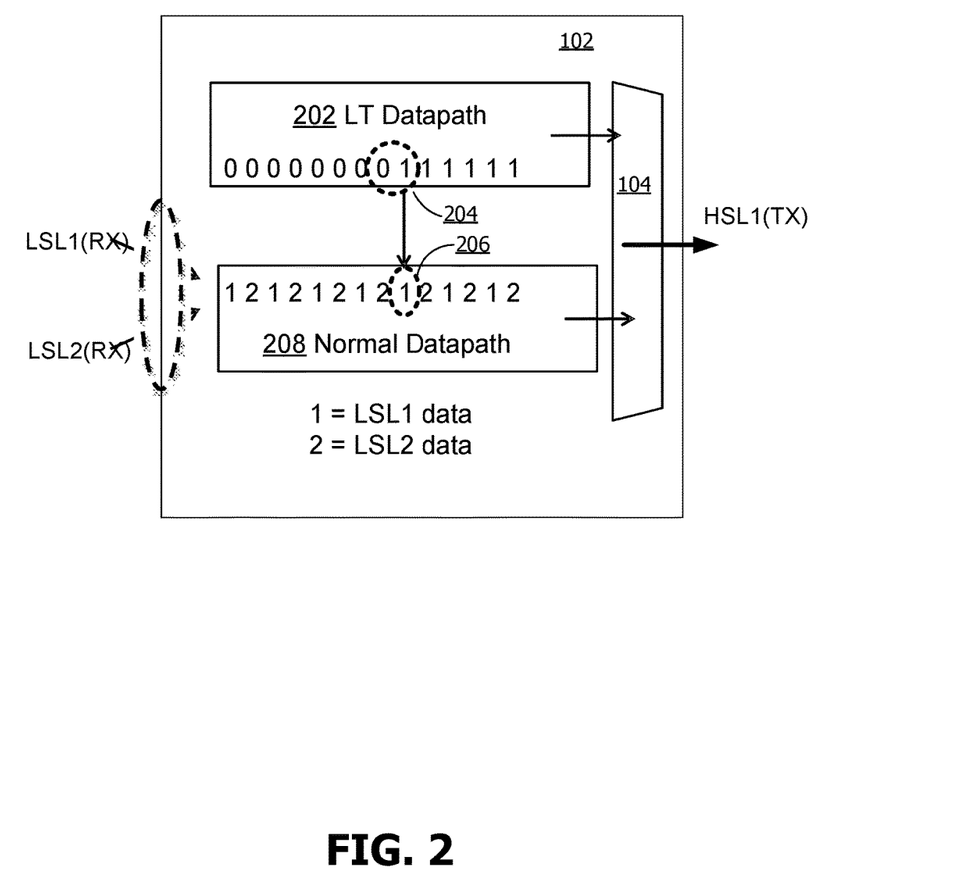
FIG. 2 is an illustration of training data timing using a uniquely identifiable logic transition in a known data pattern to indicate a start of a muxing operation from a predetermined port in a first chip, according to one or more embodiments.

Referring now to FIG. 2, an illustration is shown of training data timing using a uniquely identifiable logic transition in a known data pattern to indicate a start of a muxing operation from a predetermined port in a first chip 102, according to one or more embodiments.

LT datapath 202 consists of uniquely identifiable logic transition 204, e.g., from a 1 to 0, that occurred in the known data pattern, e.g., six repeating 1s followed by six or more repeating 0s, that originated in mux block 102 at LT datapath 106. In parallel, Normal datapath 208 is shown toggling back and forth from port 2, for LSL 2 data, to port 1, for LSL1 data, for a 2:1 ratio muxing pattern, as shown in FIG. 1 by input interface 101. At the time of the transition, mux 112 of FIG. 1 coincidentally happens to be on port 1, which is the predetermined port in the present embodiment. It is unknown apriori, when the datapath will produce the uniquely identifiable logic transition. However, when the uniquely identifiable logic transition happens, the logic in LT datapath 106, and specifically TL 109, will force the port selection on mux 112, as shown by START, which is the predetermined starting port. In one embodiment, mux 112 is switching using the predetermined sequence of ports until the uniquely identifiable logic transition occurs. In another embodiment, mux 112 is set at the predetermined first port such that the next bit after the uniquely identifiable logic transition will step the mux selector to the next predetermined port in the sequence. The data then is transmitted to the HSL1 (Tx), also as shown in FIG. 1 at output interface 103 of muxing block 102.

Figure 3:
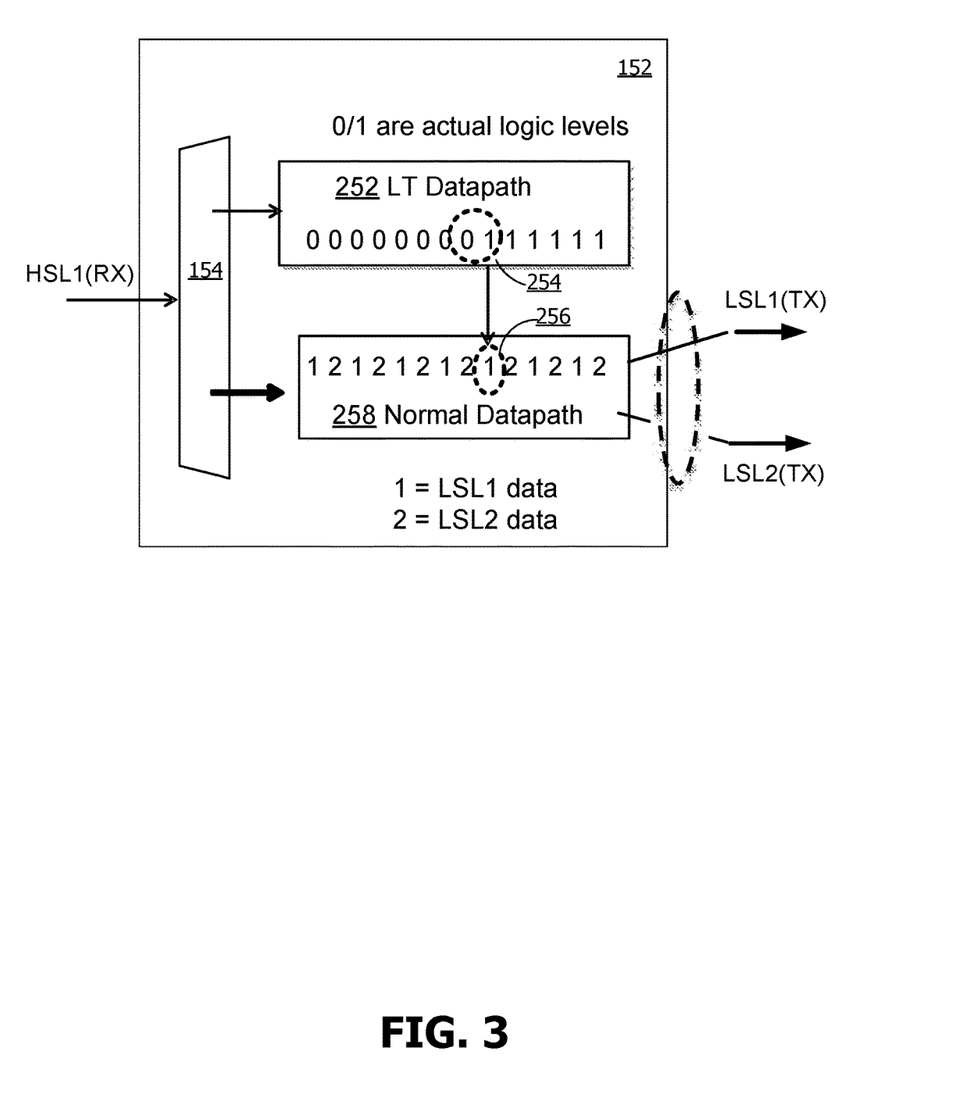
FIG. 3 is an illustration of training data timing using a uniquely identifiable logic transition in a known data pattern to indicate a start of a demuxing operation to a predetermined port in a second chip, according to one or more embodiments.

Referring now to FIG. 3, an illustration is shown of training data timing using a uniquely identifiable logic transition in a known data pattern to indicate a start of a demuxing operation to a predetermined port in a second chip 152, according to one or more embodiments.

LT datapath 252 is received from muxing chip 102, via channel link 140. LT datapath consists of uniquely identifiable logic transition 252, e.g., from a 1 to 0, that occurred in the known data pattern, e.g., six repeating 1s followed by six or more repeating 0s, that originated in mux block 102 at LT datapath 106. In parallel, Normal datapath 258 is shown toggling back and forth from port 2, for LSL 1 data, to port 1, for LSL2 data, as shown in FIG. 1 by input interface 101. At the time of the transition, mux 122 of FIG. 1 coincidentally happens to be on port 1, which is the predetermined port in the present embodiment. It is unknown apriori, when the datapath will produce the uniquely identifiable logic transition. However, when the uniquely identifiable logic transition happens, the logic in LT datapath 156, and specifically TL 159, will force the port selection on mux 122, as shown by START, which is the predetermined starting port. In one embodiment, mux 122 is switching using the predetermined sequence of ports until the uniquely identifiable logic transition occurs. In another embodiment, mux 122 is set at the predetermined first port such that the next bit after the uniquely identifiable logic transition will step the selector for mux 122 to the next predetermined port in the sequence. The data then is transmitted to the LSL1 (Tx), also as shown in FIG. 1 at output interface 113 of demuxing block 102.

Referring now to FIG. 4, a schematic is shown of a programmable port-sequencing circuit 400 for maintaining port-specific input data in one chip to port-specific output data in a second chip, according to one or more embodiments.

The given example is mux 112 for mux block 102. A mirror embodiment would exist for deux 222 for demux block 152, to ensure coherency. In the present embodiment, four muxes 401 through 404 have all four ports, P1 through P4, as inputs. The selectors for muxes 401 through 404 are provided by logic 115 as configured by memory 110. In this manner, a predetermined starting port, e.g., for input I1 to mux 112, can be set. Then the remainder of the ports can be set in a predetermined sequence. Again, demux 222 of FIG. 1 would have to be programmable too for coherence in a design implementing user selectable port sequencing. For inputs I2, I3 and I4 to mux 112, one embodiment would select ports P4, P2, P3, respectively. As previously mentioned, port selection can be changed via user configuration, such as by serial peripheral interface (SPI), I2C, MDIO, etc. The configuration could also be switched in the field and on-the-fly if buffering provisions of data and switchover were provided.

Figure 5:
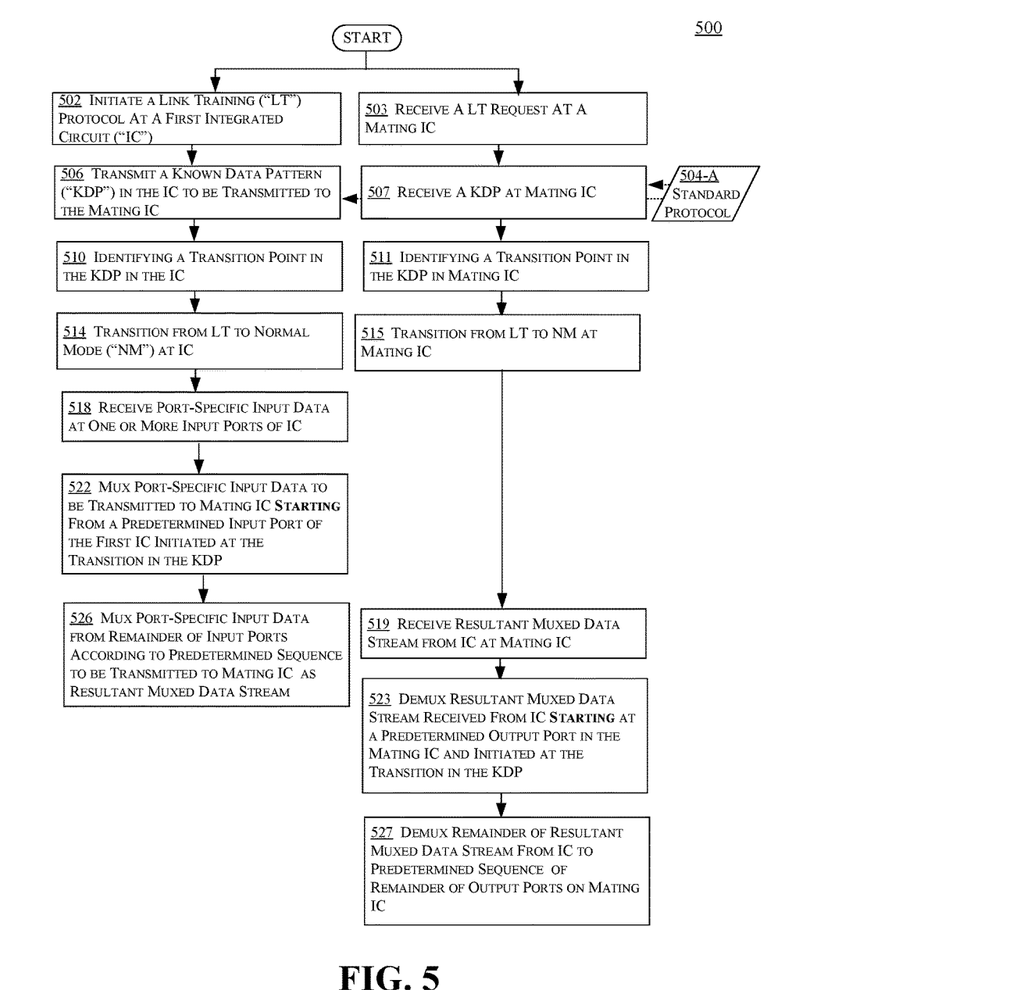
FIG. 5 is a flowchart of a method to ensure port coherency between mating chips, according to one or more embodiments.

FIG. 5 is a flowchart 500 of a flowchart of a method to ensure port coherency between mating chips, according to one or more embodiments.

Even numbered operations on the left column apply to muxing block 102; while odd numbered on the right column apply to demux block 152. Beginning with operation 502, a link training protocol is initiated at a first integrated circuit. This is a typical training that is required when bringing up two chips for givin communication protocols, such as IEEE 802.3. Thus, the LT protocol has to be executed regardless of whether port coherency is desired between the two chips. When the LT protocol is executed operation 503 provides a LT request to a mating IC, i.e., demuxing chip 152. Operation 506 transmits a known data pattern ("KDP") in the IC, mux chip 102, to be transmitted to the mating IC. Operation 507 complementarily receives the KDP from chip 102. Next, operation 510 identifies a transition point in the KDP in the LT sequence, while operation 511 also identifies the same transition point in the KDP in demux block 152 that was transmitted to it, albeit with latency for the pipeline communication from chip 102 to 152, via physical link 140. These examples are shown in FIGS. 2 and 3, respectively.

In operation 514, mux 104 switches from LT mode to mission mode for payload data to be processed by normal datapath 108, as a result of the completion of the LT, which is where the uniquely identifiable logic transition occurs in the present embodiment. Similarly, operation 515 finds mux 154 switching from LT mode to mission mode for payload data to be processed by normal datapath 158. In operation 518, port-specific input data is received at one or more input ports LSL 1-M (Rx) of input interface 101 for the mux IC 102. Thereafter, in operation 522 the port-specific input data is muxed by mux 112 into a resultant muxed data stream starting from a predetermined input port of the mux block 102, which is initiated, and aligned to, the uniquely identifiable logic transition, which is a low-frequency logic transition, in the known data pattern, for the present embodiment. Operation 519 in the demux block 152 receives the resultant muxed data stream from the mux IC via channel medium 140. Operation 523 demuxes the resultant muxed data stream received from mux chip 102, starting at a predetermined output port in the mating IC, the demux block 152, when initiated by the uniquely identifiable logic transition, which is a low-frequency logic transition, in the known data pattern. Finally, in operation 527, the remainder of the resultant muxed data stream from the mux block 102, is demuxed by demux 122, according to a predetermined sequence of the remainder of output ports.

Alternatives:

References to methods, operations, processes, systems, and apparatuses disclosed herein that are implementable in any means for achieving various aspects, and may be executed in a form of a machine-readable medium, e.g., computer readable medium, embodying a set of instructions that, when executed by a machine such as a processor in a computer, network system, integrated circuit, server, etc. cause the machine to perform any of the operations or functions disclosed herein. Functions or operations may include clocking, transmitting, receiving, timing, initializing, muxing, demuxing, and the like.

The present disclosure is applicable to any type of network including the Internet, an intranet, and other networks such as local are network (LAN); home area network (HAN), virtual private network (VPN), campus area network (CAN), metropolitan area network (MAN), wide area network (WAN), backbone network (BN), global area network (GAN), or an interplanetary Internet. The present disclosure is applicable to any type of medium in a network including copper, fiber, etc.

Methods and operations described herein can be in different sequences than the exemplary ones described herein, e.g., in a different order. Thus, one or more additional new operations may be inserted within the existing operations or one or more operations may be abbreviated or eliminated, according to a given application, so long as substantially the same function, way and result is obtained.

Although the present embodiments have been described with reference to specific example embodiments, it will be evident that various modifications and changes may be made to these embodiments without departing from the broader spirit and scope of the various embodiments.

For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine-readable medium). Similarly, the modules disclosed herein may be enabled using software programming techniques. For example, the various electrical structure and methods may be embodied using transistors, logic gates, and electrical circuits (e.g., application specific integrated ASIC circuitry and/or in Digital Signal; Processor DSP circuitry). Other features of the present embodiments will be apparent from the accompanying drawings and from the detailed description. In addition, it will be appreciated that the various operations, processes, and methods disclosed herein may be carried out, at least in part, by processors and electrical user interface controls under the control of computer readable and computer executable instructions stored on a computer-usable storage medium. The computer readable and computer executable instructions reside, for example, in data storage features such as computer usable volatile and non-volatile memory and are non-transitory. However, the non-transitory computer readable and computer executable instructions may reside in any type of computer-usable storage medium.

Specific embodiments are shown by way of example in the drawings and will herein be described in detail. It should be understood, however, that the drawings and detailed description are not intended to limit the claims to the particular embodiments disclosed, even where only a single embodiment is described with respect to a particular feature. On the contrary, the intention is to cover all modifications, equivalents and alternatives that would be apparent to a person skilled in the art having the benefit of this disclosure. Examples of features provided in the disclosure are intended to be illustrative rather than restrictive unless stated otherwise.

As used throughout this application, the word "may" is used in a permissive sense (i.e., meaning having the potential to), rather than the mandatory sense (i.e., meaning must). Similarly, the words "include," "including," and "includes" mean "including, but not limited to", for the given context.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph six, interpretation for that unit/circuit/component.

Unless specifically stated otherwise as apparent from the foregoing discussions, it is appreciated that throughout the present description of embodiments, discussions utilizing terms such as "muxing," "demuxing," "training," "aligning," "executing," or the like, refer to the actions and processes of a memory device, a computer system, or similar electronic computing device. The memory device or similar electronic computing device manipulates and transforms data represented as physical (electronic) quantities within the devices' registers and memories into other data similarly represented as physical quantities within the devices' memories or registers or other such information storage, transmission, or display devices.

The foregoing descriptions of specific embodiments of the present disclosure have been presented for purposes of illustration and description. They are not intended to be exhaustive or to limit the invention to the precise forms disclosed. Many modifications and variations are possible in light of the above teaching without departing from the broader spirit and scope of the various embodiments. The embodiments were chosen and described in order to explain the principles of the invention best and its practical application, in order to enable others skilled in the art to best utilize the invention and various embodiments with various modifications as are suited to the particular use contemplated. It is intended that the scope of the invention be defined by the Claims appended hereto and their equivalents.

We claim:

1. An integrated circuit (IC) comprising:
an input interface having one or more input ports for receiving port-specific input data;
an output interface having one or more output ports for transmitting port-specific output data; and
training logic, coupled to at least one of the input interface and the output interface, and wherein:
a quantity of the one or more input ports is not required to be equal to a quantity of the one or more output ports;
the training logic is configured to either:
coherently mux, if the IC is configured as a muxing function, the port-specific input data from the one or more input ports of the IC and transmit a resultant muxed data stream to a mating IC; or
coherently demux, if the IC is configured as a demuxing function, the resultant muxed data stream received from the mating IC into the port-specific output data for the one or more output ports of the IC;
no additional information is required to be transmitted with the resultant muxed data stream following execution of a training protocol;
the training protocol is not required to have a provision for maintaining coherency of the port-specific input data or the port-specific output data.

2. An integrated circuit (IC) comprising:
an input interface having one or more input ports for receiving port-specific input data;
an output interface having one or more output ports for transmitting port-specific output data; and
training logic, coupled to at least one of the input interface and the output interface, and wherein:
a quantity of the one or more input ports is not required to be equal to a quantity of the one or more output ports;
the training logic is configured to either:
coherently mux, if the IC is configured as a muxing function, the port-specific input data from the one or more input ports of the IC and transmit a resultant muxed data stream to a mating IC; or
coherently demux, if the IC is configured as a demuxing function, the resultant muxed data stream received from the mating IC into the port-specific output data for the one or more output ports of the IC;
no additional information is required to be transmitted with the resultant muxed data stream following execution of a training protocol; and
the training protocol is not required to have a provision for maintaining coherency of the port-specific input data or the port-specific output data;
the training logic is configured to use a link training (LT) protocol to align data in a normal data path in order to maintain coherency for the port-specific input data; and
the LT protocol is not required to have a provision for maintaining coherency of the port-specific input data or the port-specific output data.

3. The IC of claim 1 further comprising:
a first multiplexer, if the IC is configured as the muxing function, for muxing data received on the one or more input ports, received from a first external IC, to the one or more output ports destined for the mating IC; or
a first demultiplexer, if the IC is configured as the demuxing function, for demuxing data received on the one or more input ports to the one or more output ports destined for a second external IC.

4. The IC of claim 2 wherein:
the training logic is configured to sequence the port-specific input data starting with a predetermined input port to be transmitted on one of the one or more output ports if the IC is configured as the muxing function; or
the training logic is configured to sequence the port-specific output data starting with a predetermined output port to be received on the one or more input ports if the IC is configured as the demuxing function; and
the predetermined input port and the predetermined output port are initiated by a uniquely identifiable logic transition in a known data pattern in the LT protocol.

5. The IC of claim 4 further wherein:
the training logic is configured to sequence the port-specific input data for a remainder of the input ports in a predetermined order to be transmitted on the one or more output ports if the IC is configured as the muxing function; or
the training logic is configured to sequence the port-specific output data for a remainder of the output ports in a predetermined order to be received on the one or more input ports if the IC is configured as the demuxing function.

6. The IC of claim 3 wherein:
the resultant muxed data stream that was muxed by the first multiplexer in the IC can be coherently demuxed at the mating IC without transmitting overhead information identifying a port associated with the port-specific input data.

7. The IC of claim 3 further comprising:
muxing logic for M:N muxing of M input ports of port-specific input data to N output ports of the resultant muxed data stream; and wherein:
the muxing logic is configured to sequence data received at the first multiplexer according to a physical attribute of the one or more input ports.

8. The IC of claim 3 further comprising:
demuxing logic for N:M demuxing of N input ports of the resultant muxed data stream into M output ports of port-specific output data; and wherein:

the demuxing logic is configured to sequence data received at the first demultiplexer according to a physical attribute of the output port.

9. The IC of claim 1 further comprising:
link training datapath (LTD) logic for establishing a communication link with the mating IC using training data;
a normal mode datapath (NMD) for communicating the port-specific input data on the communication link: and
a second multiplexer coupled to the output interface and to the LTD and the NMD; and wherein:
the second mux is configured to selectively couple the LTD or the NMD to the output interface.

10. The IC of claim 3 further comprising:
a memory coupled to the output ports; and wherein:
the memory is configured to store a programmable sequence pattern of the one or more input ports for muxing or the one or more output ports for demuxing.

11. A network system comprising:
a first IC comprising:
an input interface having one or more input ports for receiving port-specific input data;
an output interface having one or more output ports for transmitting port-specific output data; and
training logic coupled to the output interface of the first IC;
a second IC comprising:
an input interface, having one or more input ports for receiving port-specific input data;
an output interface having one or more output ports for transmitting port-specific output data; and
training logic coupled to the input interface of the second IC; and
a channel coupling the first IC to the second IC; and wherein:
a quantity of the one or more input ports of the first IC is not required to be equal to a quantity of the one or more output ports of the first IC;
a quantity of the one or more input ports of the second IC is not required to be equal to a quantity of the one or more output ports of the second IC;
the training logic of the first IC is configured to coherently mux the port-specific input data from the one or more input ports of the first IC and transmit a resultant muxed data stream to the second IC;
the training logic of the second IC is configured to coherently demux the resultant muxed data stream received from the first IC into the port-specific output data on the one or more output ports of the second IC;
no additional information is required to be transmitted with the resultant muxed data stream following execution of a training protocol; and
the training protocol is not required to have a provision for maintaining coherency of the port-specific input data or the port-specific output data.

12. The network system of claim 11, further comprising:
the training logic of the first IC and the training logic of the second IC are both configured to use a link training (LT) protocol to align data in a normal data path for coherency between the port-specific input data and the port-specific output data of the first IC and the second IC, respectively.

13. The network system of claim 11, wherein:
the first IC further comprises:
a first multiplexer for muxing the port-specific input data received on the input interface of the first IC into the resultant muxed data stream; and
the second IC further comprises:
a first demultiplexer for demuxing the resultant muxed data stream received from the first IC; and
the coherency of port-specific input data of the first IC is maintained at the port-specific output data of the second IC.

14. The network system of claim 11, wherein:
the training logic of the first IC is configured to generate a known data pattern from an LT protocol, which is transmitted to the training logic of the second IC;
the training logic of the first IC is configured to mux the port-specific input data received on one or more input ports of the first IC in a predetermined order to the resultant muxed data stream;
the predetermined order for the mux is initiated by a uniquely identifiable logic transition in the known data pattern generated by the training logic of the first IC:
the training logic of the second IC is configured to receive the known data pattern from the LT protocol;
the training logic of the second IC is configured to demux the resultant muxed data stream received from the first IC in a predetermined order;
the predetermined order for the demux is initiated by a uniquely identifiable logic transition in the known data pattern received by the training logic of the second IC.

15. The network system of claim 11, further comprising:
the training logic of the first IC is configured to sequence data for muxing starting with a predetermined input port; and
the training logic of the second IC is configured to sequence data for demuxing starting with a predetermined output port; and wherein:
the predetermined input port and the predetermined output port remain fixed.

16. A method for maintaining lane coherency between a plurality of ICs, the method comprising:
executing via logic in a first IC, a training protocol;
receiving port-specific input data at one or more input ports of the first IC; and
configuring a training logic of the first IC to either:
coherently mux, if the first IC is configured as a muxing function, the port-specific input data from the one or more input ports of the first IC and transmitting a resultant muxed data stream to a mating IC; or
coherently demux, if the IC is configured as a demuxing function, the resultant muxed data stream received from the mating IC into a port-specific output data for one or more output ports of the IC; and wherein:
a quantity of the one or more input ports of the first IC is not required to be equal to a quantity of the one or more output ports of the first IC;
no additional information is required to be transmitted with the output data following execution of the training protocol for maintaining coherently of port-specific input data or port-specific output data; and
the training protocol is not required to have a provision for maintaining coherently of port-specific input data or port-specific output data.

17. The method of claim 16, further comprising:
aligning port-specific input data in the first IC in a normal data path using a link training (LT) protocol to maintain coherency for the port-specific input data; and
  the LT protocol is not required to have a provision for maintaining coherency of the port identity.

18. The method of claim 16, further comprising:
generating a known data pattern in the LT protocol from the first IC;
identifying a unique logic transition in the known data pattern in the first IC;
muxing the port-specific input data, via the logic in the first IC, starting with a predetermined input port that is initiated by the uniquely identifiable logic transition;
muxing the port-specific input data received at the first IC from a remainder of the plurality of input ports in a predetermined sequence; and
coherently demuxing the resultant muxed data stream at the mating IC such that the port-specific output data at the mating IC is coherent with the port-specific input data from the first IC.

19. The IC of claim 1 wherein:
the port-specific input data is not an optical signal.

20. The IC of claim 1 wherein:
the additional information not required to be transmitted with the resultant muxed data stream following execution of a training protocol includes wavelength of the port-specific input data.

* * * * *